United States Patent
Jollota et al.

(10) Patent No.: US 9,357,445 B2
(45) Date of Patent: *May 31, 2016

(54) CONNECTION INITIATION IN WIRELESS NETWORKS INCLUDING LOAD BALANCING

(75) Inventors: James M. Jollota, Simi Valley, CA (US); Matthew Kuiken, Goleta, CA (US)

(73) Assignee: Strix Systems, Inc., Camarillo, CA (US)

(*) Notice: Subject to any disclaimer, the term of this patent is extended or adjusted under 35 U.S.C. 154(b) by 573 days.

This patent is subject to a terminal disclaimer.

(21) Appl. No.: 12/885,908

(22) Filed: Sep. 20, 2010

(65) Prior Publication Data

US 2011/0032903 A1 Feb. 10, 2011

Related U.S. Application Data

(63) Continuation of application No. 11/621,959, filed on Jan. 10, 2007, now Pat. No. 7,835,325, which is a continuation of application No. 10/701,374, filed on Nov. 3, 2003, now abandoned, which is a continuation (Continued)

(51) Int. Cl.
*H04W 4/00* (2009.01)
*H04W 36/00* (2009.01)
(Continued)

(52) U.S. Cl.
CPC ............ *H04W 36/0055* (2013.01); *H04B 7/022* (2013.01); *H04N 21/4126* (2013.01); *H04W 36/30* (2013.01); *H04W 48/20* (2013.01); *H04W 84/18* (2013.01)

(58) Field of Classification Search
CPC ...................................................... H04Q 7/00

USPC ......... 370/331, 332, 342, 315, 328, 338, 329, 370/465, 251; 455/436, 561, 554, 41, 66, 455/33.2, 422, 410, 426, 444
See application file for complete search history.

(56) References Cited

U.S. PATENT DOCUMENTS

| 2,287,614 A | 6/1942 | Hawkins |
| 3,246,742 A | 4/1966 | Coe |

(Continued)

FOREIGN PATENT DOCUMENTS

| EP | 1 091 602 A2 | 4/2001 |
| WO | WO-00 69186 | 11/2000 |
| WO | WO-01 20940 | 3/2001 |

OTHER PUBLICATIONS

Albrecht M. et al.: "IP services over Bluetooth: leading the way to a new mobility". Proceedings 24th conference on local computer networks; LCN'99, IEEE Computer Soc. Los Alamitos, CA, USA 1999, pp. 2-11.

(Continued)

*Primary Examiner* — Michael T Vu
(74) *Attorney, Agent, or Firm* — Shabbi S. Khan; Foley & Lardner LLP

(57) ABSTRACT

Disclosed embodiments include a method for establishing a wireless communication session between a base station unit and a mobile unit wherein a system controller determines which base station unit of multiple base station units is an optimal base station unit to establish the session. The method includes the system controller receiving commands from each of multiple BSUs that have received a request for wireless service from a mobile unit. The commands include information, such as a unique identifier for the sending BSU, signal strength information for the sending BSU, and channel availability for the sending BSU. The system controller directs the optimal BSU to respond to the request, and directs every other BSU to ignore the request. In at least one embodiment, Bluetooth commands are used.

16 Claims, 5 Drawing Sheets

Related U.S. Application Data of application No. PCT/US02/13710, filed on May 2, 2002.

(60) Provisional application No. 60/288,270, filed on May 2, 2001.

(51) Int. Cl.
| | |
|---|---|
| *H04B 7/02* | (2006.01) |
| *H04N 21/41* | (2011.01) |
| *H04W 36/30* | (2009.01) |
| *H04W 48/20* | (2009.01) |
| *H04W 84/18* | (2009.01) |

(56) References Cited

U.S. PATENT DOCUMENTS

| | | | |
|---|---|---|---|
| 4,573,206 A | 2/1986 | Grauel | |
| 4,670,899 A | 6/1987 | Brody | |
| 5,187,810 A | 2/1993 | Yoneyama et al. | |
| 5,212,806 A | 5/1993 | Natarajan | |
| 5,666,662 A * | 9/1997 | Shibuya | 455/456.4 |
| 5,734,646 A | 3/1998 | I et al. | |
| 5,754,959 A | 5/1998 | Ueno | |
| 5,796,722 A | 8/1998 | Kotzin | |
| 5,825,780 A | 10/1998 | Christie | |
| 5,884,187 A | 3/1999 | Ziv et al. | |
| 5,987,062 A | 11/1999 | Engwer et al. | |
| 6,014,567 A | 1/2000 | Budka | |
| 6,014,572 A | 1/2000 | Takahashi et al. | |
| 6,055,433 A | 4/2000 | Yuan | |
| 6,069,871 A | 5/2000 | Sharma | |
| 6,091,953 A | 7/2000 | Ho et al. | |
| 6,097,951 A | 8/2000 | Ernam | |
| 6,129,604 A | 10/2000 | Maveddat | |
| 6,138,016 A | 10/2000 | Kulkarni | |
| 6,138,025 A | 10/2000 | Lee | |
| 6,148,201 A | 11/2000 | Ernam | |
| 6,157,836 A | 12/2000 | Cashman | |
| 6,163,699 A | 12/2000 | Naor | |
| 6,201,812 B1 | 3/2001 | Christie | |
| 6,307,849 B1 | 10/2001 | Tiedemann, Jr. | |
| 6,438,378 B1 | 8/2002 | Kouno et al. | |
| 6,448,906 B1 | 9/2002 | Nachtsheim et al. | |
| 6,539,225 B1 * | 3/2003 | Lee | 455/436 |
| 6,574,266 B1 | 6/2003 | Haartsen | |
| 6,580,700 B1 | 6/2003 | Pinard et al. | |
| 6,591,100 B1 * | 7/2003 | Dent | 455/434 |
| 6,675,015 B1 | 1/2004 | Martini et al. | |
| 6,697,638 B1 | 2/2004 | Larsson et al. | |
| 6,704,346 B1 | 3/2004 | Mansfield | |
| 6,760,581 B2 | 7/2004 | Dutta | |
| 6,788,656 B1 | 9/2004 | Smolentzov et al. | |
| 6,856,789 B2 | 2/2005 | Pattabiraman et al. | |
| 6,909,705 B1 | 6/2005 | Lee et al. | |
| 6,961,573 B1 | 11/2005 | Moon et al. | |
| 6,975,608 B1 * | 12/2005 | Park et al. | 370/332 |
| 7,146,636 B2 * | 12/2006 | Crosbie | 726/7 |
| 7,158,492 B2 | 1/2007 | Haverinen | |
| 2001/0050643 A1 | 12/2001 | Egorov et al. | |
| 2002/0022453 A1 | 2/2002 | Balog et al. | |
| 2002/0077139 A1 | 6/2002 | Bouet | |
| 2002/0114303 A1 * | 8/2002 | Crosbie et al. | 370/338 |
| 2002/0126692 A1 | 9/2002 | Haartsen | |
| 2002/0129170 A1 | 9/2002 | Moore et al. | |
| 2003/0036350 A1 * | 2/2003 | Jonsson et al. | 455/41 |

OTHER PUBLICATIONS

Baatz S. et al.: "Handoff support for mobility with IP over Bluetooth", Local Computer networks, 2000; LCN 2000: Proceedings 25$^{th}$ Annual IEEE Conference on Nov. 8-10, 2000, Piscataway, NJ, USA, IEEE, Nov. 8, 2000.

* cited by examiner

CONNECTION INITIATION IN WIRELESS NETWORKS INCLUDING LOAD BALANCING

RELATED APPLICATIONS

This application is a continuation application of the Non-provisional patent application Ser. No. 11/621,959 filed Jan. 10, 2007 now U.S. Pat. No. 7,835,325, which is a continuation application of the Non-provisional patent application Ser. No. 10/701,374 filed Nov. 3, 2003 now abandoned, which is a National Stage of international PCT application No. PCT/US02/13710 filed May 2, 2002 and published as WO2002/089356 on Nov. 7, 2002, which claims priority to U.S. Provisional Patent Application No. 60/288,270, entitled Method for Load Balancing Networks, filed May 2, 2001, each of which is hereby incorporated by reference.

TECHNICAL FIELD

The disclosed embodiments relate to wireless systems and networks.

BACKGROUND

As wireless communications technology has evolved, a variety of hardware and software solutions have been used to implement wireless networks. No clear standard for many of the design aspects of wireless systems now exists, and each of the differently designed networks has advantages and disadvantages. One of the variables in wireless networking is the wireless networking protocol used.

Global system for mobile communications (GSM, originally "Groupe de travail Spéciale pour les services Mobiles") is a standard, or protocol, for digital cellular communications in the process of being adopted by over 60 countries. The GSM standard is currently used in the 900 MHz and 1800 MHz bands, and is typically used in wide area network applications. GSM, and other standards for wireless telephony, such as code division multiple access (CDMA), or "spread spectrum" include methods for handing a session off to a new coverage area, or cell, as the mobile device moves from cell to cell. Previous standards also have disadvantages, however. For example, the mobile telephony service may be unreliable or unavailable in certain areas. For those standards that use regulated regions of the radio frequency (RF) spectrum, rights to use the regulated regions of the spectrum must be obtained.

A personal communications network (PCN) is any network that supports personal communication services (PCS). The PCS are telecommunications services that bundle voice communications, numeric and text messaging, voice-mail and various other features into one device, service contract and bill. PCN does not share all of the limitations of traditional cellular telephony, and offers potentially wider application. For example, PCN offers wider bandwidth, or "broadband access", and can provide greater availability with higher reliability than cellular in some geographic areas. In addition, PCN does not use a regulated area of the RF spectrum. PCN does use various wireless networking standards, such as Institute of Electronic and Electrical Engineering (IEEE) 802.11 and IEEE 802.11b, which use direct-sequence spread spectrum, and Bluetooth, which uses frequency-hopping spread spectrum. Ericsson initially developed Bluetooth as an inexpensive solution to unwiring devices, such as in an office environment. Bluetooth uses a special short-range radio frequency to communicate data between a Bluetooth transmitter and a Bluetooth receiver. Bluetooth, and similar standards used with PCN, currently lack the ability to adequately support movement of the host mobile device from one cell to another, and to adequately perform load balancing.

Details of the Bluetooth standard may be found at http://www.palowireless.com. Further details of the Bluetooth standard, and other wireless systems, may be found at:

"Specification of the Bluetooth System," version 1.1: http://www.bluetooth.com/developer/specification/specification.asp;

IETF draft: "Temporally-Ordered Routing Algorithm (TORA) Version 1 Functional Specification"-http://www.ics.uci.edu/~atm/adhoc/paper-collection/corson-draft-ietf-manet-tora-spec-00.txt;

Text: "Mobile Communications", Jochen Schiller, Addison-Wesley, 2000;

Text: "Bluetooth—Connect Without Wires", Bray & Sturman, Prentice Hall PTR, 2001;

Text: "Bluetooth Revealed", Miller & Bisdikian, Prentice Hall PTR, 2001; and

Text: "Bluetooth Demystified", Muller, McGraw-Hill, 2001.

An example of the failure of traditional Bluetooth networks to handle true mobility is the typical connection initiation process. Typically, in order to access a particular personal communication service (e.g., LAN Access Point, Phone, etc), the Bluetooth mobile device sends a request for service to all base station units (BSUs) within range, in the form of a standard Bluetooth command. In prior Bluetooth networks, the Bluetooth mobile device receives responses from every appropriately capable BSU within range, as well as from every other appropriately capable Bluetooth device within range. The Bluetooth mobile device must then choose to complete a connection to one of the responding BSUs, which is burdensome overhead for the mobile device. For example, every mobile device, or user, must examine data in every response, and make some load balancing decisions based on data from each of the responding BSUs.

DETAILED DESCRIPTION

The following description provides specific details for a thorough understanding of, and enabling description for, embodiments of the invention. However, one skilled in the art will understand that the invention may be practiced without these details. In other instances, well known structures and functions have not been shown or described in detail in order to avoid obscuring the description of the embodiments of the invention.

A method and apparatus for establishing a connection between a mobile wireless device and a base station unit (BSU) are described. When an attempt to initiate a wireless session is made by a mobile device, every BSU in range receives a request from the mobile device. In one embodiment, all of the BSUs that received the request communicate among themselves to determine the "optimal BSU" for the requested wireless session. Once the determination is made among the receiving BSUs, one useable response is sent to the requesting mobile device from the optimal BSU. Load balancing is performed in the course of communication between the BSUs. The embodiments described reference the Bluetooth standard, but many wireless communication systems are applicable.

Using standard Bluetooth Inquiry, when a mobile device or mobile unit (MU) enters the PCN of one embodiment, and when it powers on, the MU and the PCN initiate a communication session. This session, or link is initiated using any one of four procedures described in the Bluetooth core specification (Inquiry, Inquiry-scan, Page, and Page-scan). The MU attempts to locate devices that feature services it requires under the wireless link, such as LAN Access Point, Voice Base Station, Phone, etc. Inquiry is a Bluetooth procedure that enables a device to discover which devices are in range, and to determine addresses and clocks for the devices. The Inquiry procedure involves a source, in this case, the MU, sending inquiry packets and receiving inquiry replies. Destination units that receive the inquiry packets, in this case BSUs, should be in an inquiry scan state to receive the inquiry packets. The destination units then enter the inquiry response state and send an inquiry reply to the source unit. After the Inquiry procedure has completed, a connection can be established using the Bluetooth paging procedure.

Figure 1:
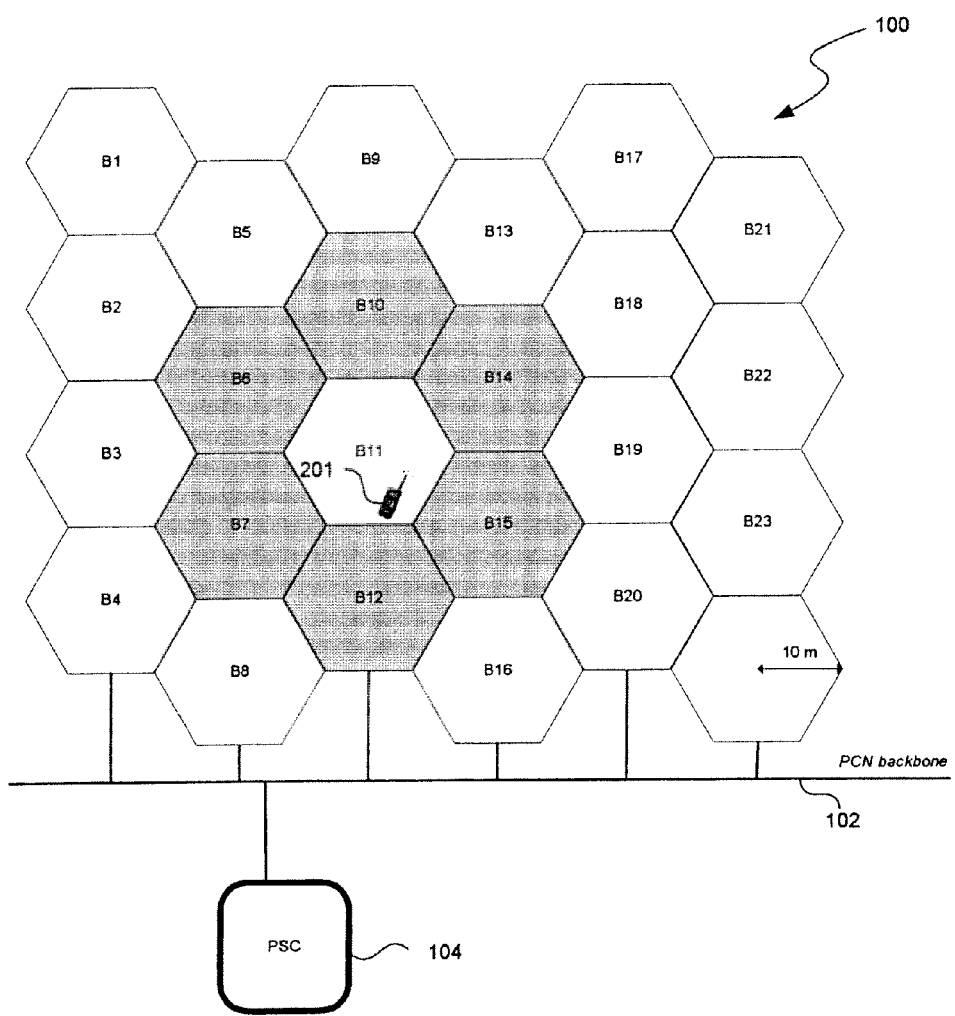
FIG. 1 is a diagram of an embodiment showing a mobile user device in a wireless network with multiple base station units.

FIG. 1 is a diagram of an arrangement of BSUs in a wireless network 100 of one embodiment. The use of hexagons to represent BSU cells is for clarity only. In a real PCN installation, a particular BSU can have less than six neighbors or more than six neighbors. It is not unusual for cells to have significantly more overlap than implied by FIG. 1. An MU 201 is shown in cell B11, which has six neighbor cells. The cells are connected (via a wired or wireless connection) so as to communicate with a wireless pocket mobility network (PMN) backbone 102. A PMN system controller, PSC 104 is also connected to the PMN backbone 102. One PSC 104 is shown, but multiple PSCs can be in a wireless network. The PMN is further described in the following U.S. patent applications: Link Context Mobility, such as for use in a Wireless Network, Ser. No. 60/262,558, filed Jan. 18, 2001; Wireless Base Station Neighbor Discovery, Ser. No. 60/288,296, filed May 2, 2001; Wireless System Base Station to Base Station Synchronization, Ser. No. 60/288,294, filed May 2, 2001; and Frequency Hopping Spread Spectrum Wireless Systems Interference Mitigation by Transmit Suppression, Ser. No. 60/288,301, filed May 2, 2001.

Figure 2:
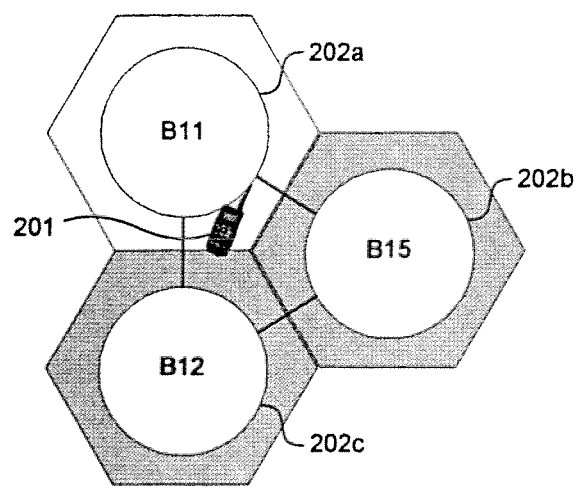
FIG. 2 is a diagram illustrating base station unit (BSU) availability for the mobile unit under an embodiment of the invention.

FIG. 2 is a diagram of the region around the MU 201. As the MU 201 powers up within the B11 cell, or transitions from a low-power state to an active state, there are often multiple BSUs with adequate signal strength to accept the MU 201 Bluetooth connection. If the MU 201 is in the area within the circle 202a, only BSUs in the B11 cell have adequate signal strength to complete the connection with the MU 201. If the MU 201 is outside the area within circle 202a, as shown above, the signal strength difference between BSUs in the B11 cell, the BSUs in the B12 cell, and the BSUs in the B15 cell is not significant. A BSU in any of the cells could accept the connection and offer similar performance. After power-up, the probability of the MU 201 moving in any one direction, that is, towards any of the candidate BSUs, is the same. BSUs in each of the three cells are each equally qualified to complete the connection.

Upon receiving the Inquiry, or any of the other Bluetooth initiation procedure messages, each BSU sends a Received_MU command, or data structure, to the PSC. The Received_MU command includes the MU 201 Bluetooth address (BD_ADDR), the RSSI of the received MU 201 request, the current radio channel allocation of the BSU, including number of available radios, and the number of asynchronous connectionless links (ACL links) and synchronous connection oriented links (SCO links) used by each radio, as described below. In addition, the amount of data sent to the PSC can be expanded as system parameters change. For example, additional parameters such as the number of used radio channels allocated for handoff for each BSU can be sent to the PSC.

The PSC receives these Received_MU commands from multiple BSUs, and determines which of the BSUs is the "optimal BSU" to answer the MU 201 Inquiry. Answering the MU 201 inquiry implies that the BSU will complete a wireless connection with the MU and communicate with the MU. In one embodiment, the optimal BSU has a minimum number of ACL or SCO links per radio for the most efficient use of bandwidth in the network. A system configurable number of radio channels is allocated to support the handoff of the MU from cell to cell. Even if a BSU has some radio capacity, handoff-support is better assured if these handoff channels are left idle. MU signal strength, radio channel allocation, and handoff-channel allotment are compared by the PSC to determine which BSU, and thus which radio-channel, is optimal, as described herein.

The PSC sends an Accept_MU command to the optimal BSU. All of the other BSUs that sent Received_MU commands to the PSC receive Ignore_MU command in response. The Ignore_MU command tells a BSU to ignore the MU Inquiry.

Figure 3:
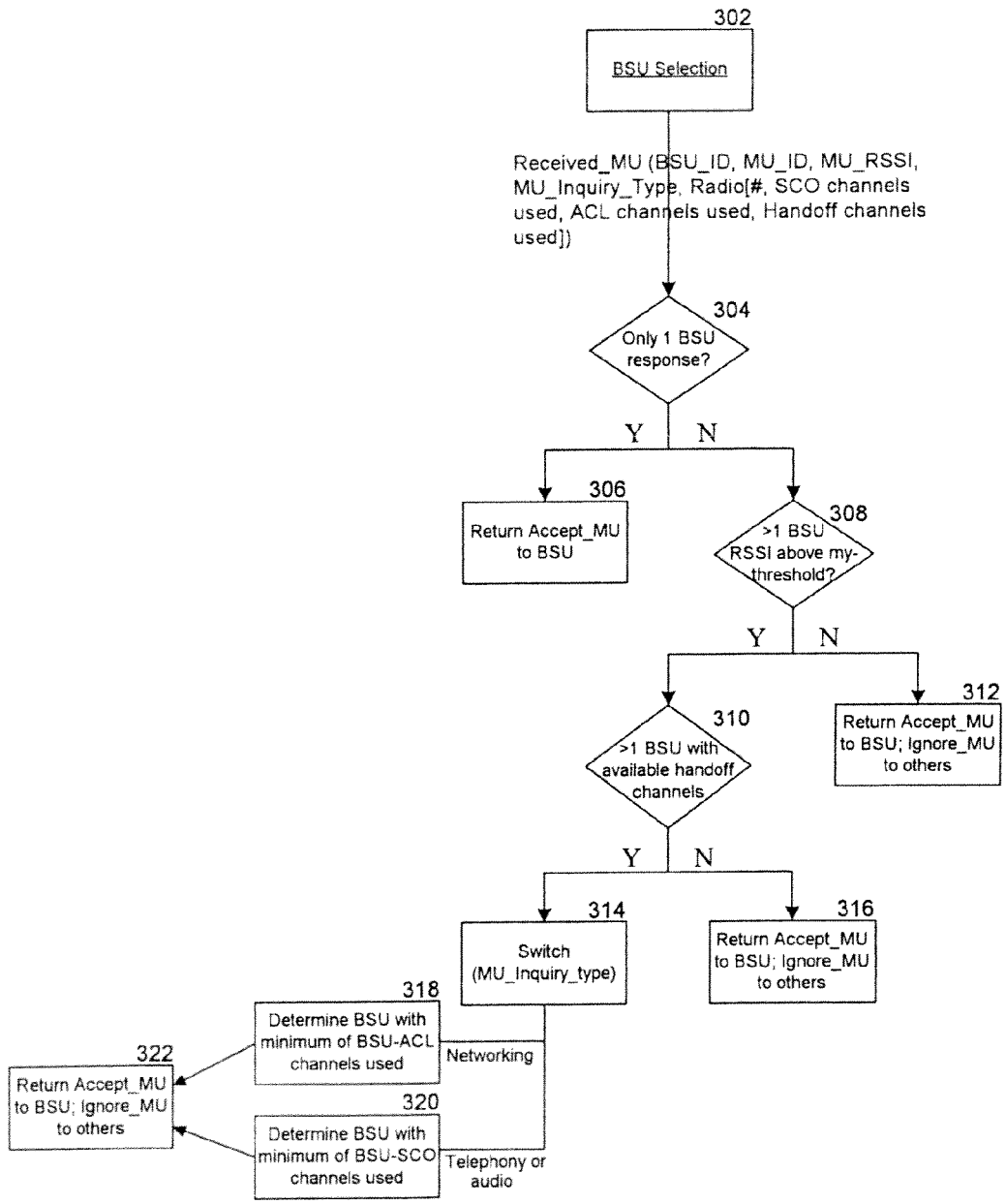
FIG. 3 is a flow diagram illustrating determining an optimal BSU in one embodiment.

FIG. 3 is a flow chart illustrating one embodiment of a routine performed by the PSC to determine the optimal BSU. Table 1 lists and describes some Bluetooth variables and settings, and can be referred to along with FIG. 3. Table I effectively describes one embodiment of the Received_MU data structure.

TABLE 1

Received_MU Data Structure

| ID | Description |
|---|---|
| BSU_ID | A unique identifier for each BSU in the system. |
| MU_ID | A unique identifier for each MU in the system, may be the same as, or related to, BD_ADDR. |
| MU_RSSI | The received signal strength for the MU, measured by the BSU. |
| MU_Inquiry_Type | Indicates whether the MU inquired for a data device or a voice device |
| Radio-# | A unique identifier for each radio within the BSU. |

TABLE 1-continued

Received_MU Data Structure

| ID | Description |
| --- | --- |
| Radio-SCO Channels Used | Indicates how many synchronous channels are in use for the radio. |
| Radio-ACL Channels Used | Indicates how many asynchronous channels are in use for the radio. |
| Radio-Handoff Channels Used | Indicates how many allocated handoff channels are in use for the BSU. |
| My_Threshold | Indicates the minimum acceptable RSSI for BSU to MU radio communication. |
| Minimum Handoff Channels | System-wide configuration allotting a certain number of radio channels for use during BSU to BSU handoff. |

BSU selection begins in block 302, where the PSC receives includes the transmission of Received_MU commands from each of the BSUs within range of the inquiring MU. The Received_MU commands each include a field or data structure: BSU_ID; MU_ID; MU_RSSI; MU_Inquiry_Type; and Radio data, as shown in Table 1. The radio data includes Radio #, which is a unique identifier for each radio within the BSU, a number of SCO channels used, a number of ACL channels used, and a number of Handoff channels used. The PSC determines in block 304 whether it received Received_MU commands from only one responding BSU. If so, then the PSC determines that the single BSU is the optimal BSU. The PSC returns an Accept_MU command in block 306 to the BSU.

When the PSC determines that it received more than one Received_MU command, it compares in block 308 the MU_RSSI from each of the Received_MU commands against a predetermined threshold ("My_Threshold"). If the PSC in block 312 determines that only one of the BSUs has a RSSI greater than My_Threshold in block 312, the PSC returns an Accept_MU command to the BSU with the acceptable RSSI. Also in block 312, the PSC sends Ignore_MU commands to all of the other BSUs that sent Received_MU commands.

If there is more than one BSU with a RSSI greater than My_Threshold, the PSC compares in block 310 the number of channels available against a predetermined number of available channels. When only one BSU has available handoff channels, the PSC in block 316 returns an Accept_MU command to the BSU with the available handoff channels. Also in block 316, the PSC sends Ignore_MU commands to all of the other BSUs that sent Received_MU commands.

If there is more than one BSU with available handoff channels, the PSC switches based on MU_Inquiry_Type in block 314 in order to make one of two determinations dependent on whether the session is a networking session or a telephony or audio session. If the MU_Inquiry_Type field indicates a networking session, the PSC determines in block 318 which BSU has the minimum number of BSU-ACL channels currently used. Alternatively, if the MU_Inquiry_Type field indicates a telephony or audio session, the PSC determines in block 320 which BSU has the minimum number of SCO channels currently used. After either determination (under blocks 318 or 320) is made, the PSC in block 322 returns an Accept_MU command to the BSU with the minimum number of SCO channels currently used. Also in block 322, the PSC sends Ignore_MU commands to all of the other BSUs that sent Received_MU commands.

Figure 4:
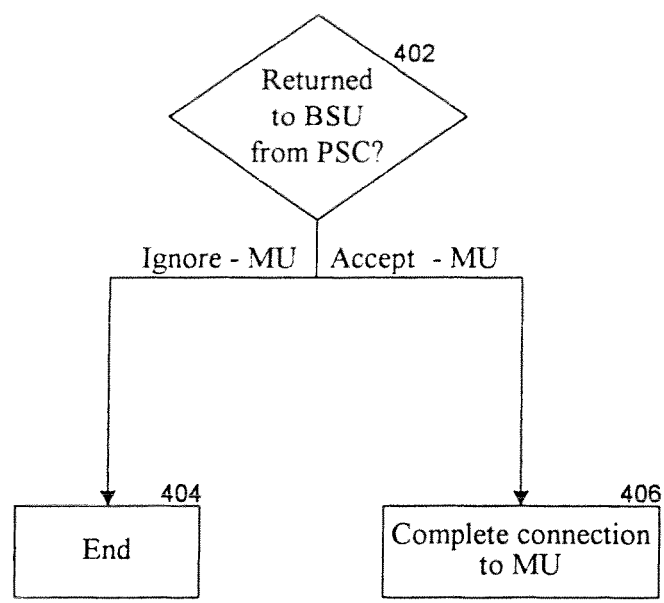
FIG. 4 is a flow diagram illustrating determining a BSU response to a mobile unit (MU) in one embodiment.

FIG. 4 is a flow diagram of BSU response to the command returned from the PSC in one embodiment. In block 402, the BSU determines whether an Ignore_MU command or an Accept_MU command was returned by the PSC. If an Ignore_MU command was received, the process is at an end in block 404. If an Accept_MU command was received, the BSU continues to communicate with the MU and completes the connection to the MU in block 406.

Figure 5:
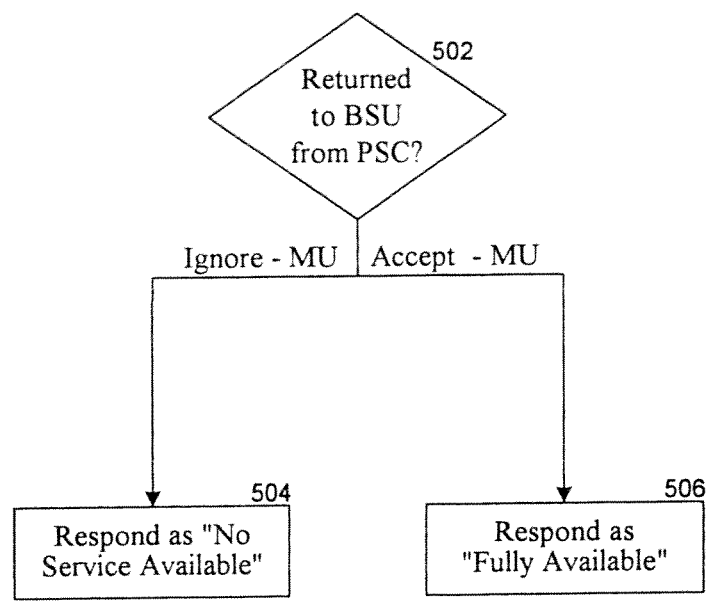
FIG. 5 is a flow diagram illustrating determining a BSU response to a mobile unit (MU) in one embodiment.

Many alternatives to the embodiments described above are possible. For example, in a first alternative embodiment, each BSU will communicate with the MU regardless of whether an Ignore_MU command or an Accept_MU command was received. Different communications occur in each case, as described below. For example, individual BSUs respond to the MU with different availability parameters. The MU then has the option to choose among responding BSUs. The BSU selection process begins and proceeds as described with reference to the embodiment of FIG. 3. The embodiment differs from the embodiment of FIG. 3 as shown in FIG. 5. At block 502, the BSU determines whether an Ignore_MU command or an Accept_MU command was returned by the PSC. If an Ignore_MU command was received, the BSU responds to the MU indicating that no service is available in block 504. If an Accept_MU command was received, the BSU responds to the MU indicating that the BSU is "fully available" in block 506. A preferred-BSU selection is still available for the MU, but the user of the MU may override the preferred-BSU if desired. One implementation of the process of FIG. 5 using Bluetooth is explained in more detail below.

During the Bluetooth Inquiry process, a Bluetooth slave-device can attempt to locate devices with the LAN Access Point device type profile. According to the Bluetooth standard, a LAN Access Point will transmit an inquiry-response, which includes the Bluetooth frequency hopping synchronization (FHS) packet type. Within the FHS packet is an indication of a "class of device" (CoD). The CoD for the LAN Access Point radio is: Networking; LAN Access Point; and a utilization/availability status. The availability status indicates whether the single radio within the Access Point is 0% utilized, 1-17% utilized, 18-33%, and so on. All BSUs receiving the Ignore_MU command from the PSC will reply to the MU (as shown at block 504 in FIG. 5) with a BSU Minor Device Class Load Factor field set to 111 indicating "no service available". If the BSU is the optimal BSU, and received the Accept_MU command, the BSU responds to the MU (as shown at block 506 of FIG. 5) with a BSU Minor Device Class Load Factor field set to 000 indicating "fully available". The MU still has the option of choosing any BSU within range.

A second alternative embodiment does not include the PSC in the decision process. All of the information that was previously described as going to the PSC from the BSU, is instead broadcast to all of the BSUs within the network. The BSUs then negotiate which BSU is the optimal BSU. Only the optimal BSU responds to the MU. This may require network traffic to broadcast the data between the BSUs.

A third alternative embodiment includes proactively transmitting the MU parameters, as described above, between each BSU during MU handoff communication or some other BSU-to-BSU operational communication. Communicating the MU parameters proactively allows the BSUs to determine the most optimal BSU to respond to an MU before the MU appears. In one embodiment, the BSUs exchange the MU parameters for MUs currently within their range, or with which the BSU is currently communicating, with any neighboring BSU to which the MU may be handed off. In this way, the BSUs have time to assess which of the possible "next" BSUs is the optimal BSU.

Those skilled in the relevant art will appreciate that the invention can be practiced with various telecommunications or computer system configurations, including Internet appliances, hand-held devices, wearable computers, palm-top computers, cellular or mobile phones, multi-processor systems, microprocessor-based or programmable consumer electronics, set-top boxes, network PCs, mini-computers, mainframe computers and the like.

Aspects of the invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor. Data structures and transmission of data particular to aspects of the invention are also encompassed within the scope of the invention. In general, while hardware platforms, such as stationary and mobile devices, are described herein, aspects of the invention are equally applicable to nodes on the network having corresponding resource locators to identify such nodes.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above, "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the PMN system described herein. These and other changes can be made to the invention in light of the detailed description.

The elements and acts of the various embodiments described above can be combined to provide further embodiments. Aspects of the invention can be modified, if necessary, to employ the systems, functions and concepts of the various patents and applications described above to provide yet further embodiments of the invention.

All of the above references and U.S. patents and applications are incorporated herein by reference.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A method for wireless communications, comprising:
    receiving from at least one mobile unit of a system for wireless communications by a plurality of base station units in a wireless communications system, an inquiry whether each of the plurality of base station units is configured to provide a wireless service for the at least one mobile unit, wherein each of the plurality of base station units is configured to communicate wirelessly with the at least one mobile unit;
    broadcasting, by each of the base station units that received the inquiry, a message comprising the inquiry and data related to the respective base station unit to each of the other base station units of the plurality of the base station units;
    negotiating between each of the plurality of base station units to determine, by at least one of the base station units that received the inquiry, an optimal base station unit from the plurality of base station units to communicate with the at least one mobile unit;
    determining, by the plurality of base station units that received the inquiry, the optimal base station unit from the plurality of base station units to communicate with the at least one mobile unit; and
    responsive to negotiating and determining, sending by the optimal base station unit to the at least one mobile unit, a response to the inquiry indicating that the base station unit is available to provide wireless service for the at least one mobile unit,
    where the optimal base station unit is determined using load balancing among the plurality of the base station units, the load balancing being determined based on a minimum number of channels in use in the optimal base station, said minimum number of channels in use in said optimum base station, wherein the minimum number of channels in use in the optimal base station unit is determined by using, depending on a type of communication requested in the inquiry from the at least one mobile unit, at least one of a minimum number of asynchronous connectionless links channels in use and a minimum number of synchronous connection oriented channels in use.

2. The method of claim 1, wherein the optimal base station unit has a received signal strength indication from the at least one mobile unit above a predetermined threshold.

3. The method of claim 1, wherein the optimal base station unit is determined by the plurality of the base station units using load balancing among base station units receiving the inquiry, wherein the optimal base station unit has a received signal strength indication from the at least one mobile unit above a predetermined threshold.

4. The method of claim 1, wherein the wireless communications between the at least one mobile station and the plurality of the base station units is provided using BLUETOOTH short-range wireless protocol.

5. The method of claim 1, wherein said message comprising said inquiry comprises one or more of:
an identification of the at least one mobile unit;
an identification of said each base station unit of said plurality of the base station units;
a received signal strength for said at least one mobile unit measured by said each base station unit of said plurality of the base station units;
a unique identifier for each radio with said each base station unit of said plurality of the base station units;
an indication of how many synchronous connection oriented channels per radio are in use in said each base station unit of said plurality of the base station units;
an indication of how many asynchronous connectionless links channels per radio are in use in said each base station unit of said plurality of the base station units;
an indication of how many allocated handoff channels are in use for said each base station unit of said plurality of the base station units;
an indication of a minimum acceptable level of said received signal strength for said at least one mobile unit measured by said each base station unit of said plurality of the base station units; and
a system-wide radio-channel allotment for use during handoff from one base station unit to another base station unit.

6. A system for wireless communications comprising:
at least one mobile unit; and
a plurality of base station units, wherein each base station unit of the plurality of the base station units is configured to communicate wirelessly with the at least one mobile unit, wherein each base station unit of the plurality of the base station units is configured to:
receive an inquiry from the at least one mobile unit whether the respective base station unit is configured to provide a wireless service for the at least one mobile unit situated at a corresponding location in the system,
broadcasting, by each of the base station units that received the inquiry, a message comprising the inquiry and data related to the base station unit broadcasting the message to other base station units of said plurality of the base station units;
negotiating between each of the plurality of base station units to determine, by the plurality of base station units that received the inquiry, an optimal base station unit from the plurality of base station units to communicate with the at least one mobile unit; determining, by the plurality of base station units that received the inquiry, the optimal base station unit from the plurality of base station units to communicate with the at least one mobile unit; and
responsive to negotiating and determining, sending by the optimal base station unit to the at least one mobile unit, a response to the inquiry indicating that the base station unit is available to provide wireless service for the at least one mobile unit,
wherein the load balancing among the base station units receiving the inquiry from the at least one mobile unit is determined based on a minimum number of channels in use in the optimal base station unit, using, depending on a type of communication requested in the inquiry from the at least one mobile unit, a minimum number of asynchronous connectionless links channels in use or a minimum number of synchronous connection oriented channels in use.

7. The system of claim 6, wherein the optimal base station unit is determined using load balancing among the plurality of the base station units receiving the inquiry from the at least one mobile unit.

8. The system of claim 6, wherein the optimal base station unit has a received signal strength indication from the at least one mobile unit above a predetermined threshold.

9. The system of claim 6, wherein the wireless communications between the at least one mobile station and the plurality of the base station units is provided using BLUETOOTH short-range wireless protocol.

10. The system of claim 6, wherein the message comprising said inquiry comprises one or more of:
an identification of the at least one mobile unit;
an identification of each base station unit of the plurality of the base station units;
a received signal strength for the at least one mobile unit measured by said each base station unit of the plurality of the base station units;
a unique identifier for each radio with each base station unit of the plurality of the base station units;
an indication of how many synchronous connection oriented channels per radio are in use in the each base station unit of the plurality of the base station units;
an indication of how many asynchronous connectionless links channels per radio are in use in each base station unit of the plurality of the base station units;
an indication of how many allocated handoff channels are in use for each base station unit of the plurality of the base station units;
an indication of a minimum acceptable level of the received signal strength for the at least one mobile unit measured by each base station unit of the plurality of the base station units; and
a system-wide radio-channel allotment for use during handoff from one base station unit to another base station unit.

11. The system of claim 6, wherein each base station unit of said plurality of the base station units is configured to handoff said at least one mobile unit to an optimal base station unit of said plurality of the base station units.

12. A base station unit of a system for wireless communications, comprising:
a transceiver;
a processor coupled to the transceiver, the processor configured to receive, via the transceiver, an inquiry from at least one mobile unit of a system for wireless communications sent to a plurality of base station units comprised in said system, the inquiry inquiring whether a base station unit of said plurality of the base station units is configured to provide a wireless service for said at least one mobile unit situated at a corresponding location in said system,
broadcast, via the transceiver, a message comprising said inquiry and data related to said base station unit to each of the other base station units of said plurality of the base station units;
negotiate, with each of the other base station units of the plurality of base station units to determine an optimal base station unit from the plurality of base station units to communicate with the at least one mobile unit; and
responsive to being determined the optimal base station unit by the plurality of base station units, send, via the transceiver, to the at least one mobile unit, a response to the inquiry indicating that the base station unit is available to provide wireless service for the at least one mobile unit, wherein said load balancing among said base station units receiving said inquiry from said at least one mobile unit is determined based on a minimum number of channels in use in the optimal base station unit by using, depending on a type of communication requested in said inquiry from said at least one mobile unit, a minimum number of asynchronous connectionless links channels in use or a minimum number of synchronous connection oriented channels in use.

13. The base station unit of claim 12, wherein the optimal base station unit is determined using load balancing among said plurality of the base station units receiving said inquiry from said at least one mobile unit.

14. The base station unit of claim 12, wherein the optimal base station unit has a received signal strength indication from said at least one mobile unit above a predetermined threshold.

15. The base station unit of claim 12, wherein the optimal base station unit is determined by said plurality of the base station units using load balancing among base station units receiving said inquiry from said at least one mobile unit, wherein the optimal base station unit has a received signal strength indication from said at least one mobile unit above a predetermined threshold.

16. The base station unit of claim 12, wherein said message comprising said inquiry comprises one or more of:

an identification of the at least one mobile unit;

an identification of said each base station unit of said plurality of the base station units;

a received signal strength for said at least one mobile unit measured by said each base station unit of said plurality of the base station units;

a unique identifier for each radio with said each base station unit of said plurality of the base station units;

an indication of how many synchronous connection oriented channels per radio are in use in said each base station unit of said plurality of the base station units;

an indication of how many asynchronous connectionless links channels per radio are in use in said each base station unit of said plurality of the base station units;

an indication of how many allocated handoff channels are in use for said each base station unit of said plurality of the base station units;

an indication of a minimum acceptable level of said received signal strength for said at least one mobile unit measured by said each base station unit of said plurality of the base station units; and a system wide radio-channel allotment for use during handoff from one base station unit to another base station unit.

* * * * *